(12) United States Patent
Hala

(10) Patent No.: US 8,101,281 B2
(45) Date of Patent: Jan. 24, 2012

(54) OPTICAL FILTER

(75) Inventor: Ralf Hala, Lindenberg (DE)

(73) Assignee: EMS-Patent AG, Domat/EMS (CH)

( * ) Notice: Subject to any disclaimer, the term of this patent is extended or adjusted under 35 U.S.C. 154(b) by 0 days.

(21) Appl. No.: 12/716,946

(22) Filed: Mar. 3, 2010

(65) Prior Publication Data

US 2010/0227163 A1    Sep. 9, 2010

(30) Foreign Application Priority Data

Mar. 4, 2009   (EP) ..................... 09154327

(51) Int. Cl.
*B32B 27/06* (2006.01)

(52) U.S. Cl. .................. 428/474.4; 428/476.3; 427/162; 430/321; 257/432

(58) Field of Classification Search ............... 428/474.4, 428/476.3; 427/162; 430/321; 257/432
See application file for complete search history.

(56) References Cited

U.S. PATENT DOCUMENTS 6,153,677 A * 11/2000 Dalla Torre et al. .......... 524/117
2002/0084023 A1   7/2002 Yamamoto et al.

FOREIGN PATENT DOCUMENTS

| EP | 1217397 | | 6/2002 |
|----|---------|---|--------|
| EP | A1217397 | * | 6/2002 |
| EP | 1712581 | | 10/2006 |
| EP | A 1712581 | * | 10/2006 |
| EP | 1804088 | | 7/2007 |
| WO | 2009/012607 | | 1/2009 |
| WO | WOA2009/012607 | * | 1/2009 |

OTHER PUBLICATIONS

Grilamid TR, "A transparent polyamide with unlimited possibilities," [Online]: http://www.mess-regeltechnik.at/LICO/Grilamed_prospekt_4007_e.pdf, XP-002541395, 2003.
European Search Report dated Aug. 14, 2009 conducted in EP 09 154 327.2.

* cited by examiner

*Primary Examiner* — Leszek Kiliman
(74) *Attorney, Agent, or Firm* — Greenblum & Bernstein, PLC

(57) ABSTRACT

The invention relates to an optical filter which comprises at least one optically effective layer and a protective layer on both sides, with at least one of the protective layers being a non-stretched protective polyamide layer which is cast from the solution. The optical filter in accordance with the invention is characterized in that the at least one protective polyamide layer consists of PA MACMI/12 and optional aggregates chosen as required. The at least one protective polyamide layer has a content of laurolactam of 23 mole percent to 57 mole percent in relation to the entire polyamide.

14 Claims, No Drawings

OPTICAL FILTER

CROSS-REFERENCE TO RELATED APPLICATIONS

The present application claims priority under 35 U.S.C. §119 to European Patent Application No. 09 154 327.2 filed Mar. 4, 2009, the disclosure of which is expressly incorporated by reference herein in its entirety.

The invention relates to an optical filter which comprises at least one optically effective layer and at least one non-stretched protective polyamide layer, casted from the solution.

Optical filters have long been known and are used for example as pass filters, complementary color filters, neutral filters, IR cut-off filters or UV cut-off filters. Applications of such filters are known for example from photography, laser technology or ophthalmology. It is known that such optical filters can easily be damaged, which is why they are preferably provided with a protective layer on one or both sides.

Functional optical lenses are known for example from EP 1 804 088 A2. They comprise an extruded polyamide layer and an optical sheet comprising a polyamide sheet layer and an optical film layer, with the polyamide sheet layer preferably containing a stretched polyamide sheet. Polyvinyl alcohol, acrylic resin, ester resin, styrene resin, polyvinyl chloride, polyamide and polycarbonate are mentioned as materials for the optical film layer. Both the extruded polyamide layer and the polyamide sheet layer mainly contain polyamides, preferably alicyclic polyamides, e.g. "Trogamid CX 7323" and "Grilamid TR 90".

A polarizing molded article is known from EP 1 217 397 A2 which contains a polarizing plate in which a polarizing layer is arranged between two protective layers. The individual layers are connected with each other by using an adhesive. The protective layer is produced by extrusion or casting. Polycarbonate, polyamide, polyester, polyurethane, polystyrene, polymethyl methacrylate, polyvinyl chloride, cellulose derivatives are mentioned among others as material for the protective layer. Celluloses, polybisphenol A carbonate and polymethyl methacrylate are especially recommended as resins for casting, and acetylcellulose and propylcellulose are used preferably.

It is the object of the present invention to provide an optical filter which comprises at least one optically effective layer and at least one non-stretched protective polyamide layer which is cast from the solution.

The optical filter is at least composed of a middle layer, the so-called optically effective layer, which on both sides has one outside layer each, the so-called protective layers.

This object is fulfilled by an optical filter according to the independent claim 1. This optical filter in accordance with the invention comprises at least one optically effective layer and at least one non-stretched protective polyamide layer which is cast from the solution. This optical filter in accordance with the invention is characterized in that the at least one protective polyamide layer consists of PA MACMI/12 and optional additives. The at least one protective polyamide layer has a content of laurolactam of 23 mole percent to 57 mole percent, relating to the entire polyamide.

These optional additives are chosen from a group which comprises inorganic and organic stabilizers, heat stabilizers, light stabilizers, UV stabilizers, UV absorbers, UV blockers, IR absorbers, NIR absorbers, antioxidants, antiozonants, nucleating agents, crystallization retardants, demolding agents, lubricants, antiblocking agents, separating agents, organic and inorganic pigments, coloring agents, condensation catalysts, chain regulators, defoaming agents, chain-extending additives, softeners, photochromic additives, non-modified and modified, natural and synthetic phyllosilicates and optical brighteners. The optional additives can be added during the production of the polyamide, the production of the film or during both productions.

Further inventive features and preferred embodiments of the invention are derived from the dependent claims.

The polyamide PA MACMI/12 for the protective polyamide layer in accordance with the invention consists of three monomers bis-(4-amino-3-methyl-cyclohexyl)-methane, isophthalic acid (I) and laurolactam or lactam 12 (12) and is exceptionally suitable for producing films from the solution. Preferably, the content of laurolactam is 23 mole percent to 57 mole percent, especially preferably 31 mole percent to 55 mole percent, more preferably 38 mole percent to 55 mole percent, each relating to the entire polyamide.

The optically effective layer of the optical filter in accordance with the invention can be a layer of polyvinyl alcohols, polyvinyl acetals, polyvinyl butyrals, or mixtures thereof or polyamide. The optical filter can contain one or several optically active layers. Optically effective layers can be oriented and/or doped. Optically effective layers made of polyvinyl alcohol or polyamide are preferable. It is known on the one hand that polyamide layers adhere very well to compatible or identical polyamide layers. It was surprisingly noticed on the other hand that the transparent protective polyamide layers in accordance with the invention enter into very good bonding both with polyvinyl alcohol films as well as polyvinyl acetal films, polyvinyl butyral films or films made of mixtures of any of the three materials. It is thus possible to apply the transparent protective polyamide layer in accordance with the invention to the optically effective layer with or without bonding agents. Structures without bonding agents are preferable.

The polyamides for the optically effective layer concern transparent polyamides made of diamines and dicarboxylic acids, and optionally lactams or $\alpha,\omega$-amino acids. Preferred diamines are hexamethylene diamine, decandiamine, undecandiamine, trimethylhexamethylene diamine, 2-methyl-1,5-pentane-diamine, bis-(4-amino-3-methyl-cyclohexyl)-methane (abbreviated MACM), bis-(4-amino-cyclohexyl)-methane (abbreviated PACM), isophorone diamine, norbonane diamine, m-xylene diamine and 1,3-bis-(aminomethyl)-cyclohexane. Preferred dicarboxylic acids are adipic acid, azelaic acid, sebacic acid, 1,12-dodecanedioic acid, brassylic acid, 1,14-tetradecanedioic acid, 1,15-pentadecanoic acid, 1,16-hexadecanedioic acid, 1,18-octadecanedioic acid, 1,3-cyclohexanedicarboxylic acid, 1,4-cyclohexanedicarboxylic acid, dimeric fatty acid with 36 or 44 C atoms, isophthalic acid, terephthalic acid and 2,6-naphthalene dicarboxylic acid. Preferred lactams are lactams or $\alpha,\omega$-amino acids with 4, 6, 7, 8, 11 or 12 C atoms. These are the lactams pyrrolidine-2-on (4 C atoms), $\epsilon$-caprolactam (6 C atoms), oenanthe lactam (7 C atoms), capryllactam (8 C atoms), lactam 11 (11 C atoms), laurinolactam (12 C atoms) or the $\alpha,\omega$-amino acids of 1,4-aminobutanoic acid, 1,6-aminohexanoic acid, 1,7-aminoheptanoic acid, 1,8-aminooctanoic acid, 1,11-aminoundecanoic acid and 1,12-aminododecanoic acid. The polyamides for the optically effective layer optionally contain additives which are chosen from the additives already mentioned for the protective polyamide layers.

An optical filter can comprise one or two non-stretched protective polyamide layers in accordance with the invention. Such an optical filter can be a cut-off filter, pass filter, short-pass filter, long-pass filter, band-pass filter, complementary color filter, IR cut-off filters, UV cut-off filters, anti-glare filters, polarization filters, dimming filter, neutral filter, multi-band filters, interference filters, conversion filters, correction filters, effect filters or any desired combination of such filters. Such an optical filter is preferred in the form of a polarization filter. Optical components with such an optical filter can be used as illumination filters, filters for laser scanners, sensors, safety curtains, spectacles, helmet visors, protective goggles, sports goggles, lenses or filters for projection devices, lenses or filters for measuring instruments, or as photographic filters.

Such an optical filter can be used further either in plane-parallel form or after forming. Such filters can be further processed by application of additional coatings by lamination, coating, back-molding or special injection molding methods. It is possible in this process to apply these coatings both with and without a bonding agent layer. The bonding agent can already be mixed into the material of the coatings as a further possibility. The coatings are applied preferably to the protective polyamide layer without a bonding agent.

The coatings have a thickness of more than 5 µm, preferably 10 µm to 15 mm, especially preferably 10 µm to 10 mm. The coatings can be designated as a layer at a thickness of 5.1 µm to 800 µm and as a body at a thickness of 801 µm to 15 mm.

The material for the coatings is preferably chemically compatible with the protective polyamide layer. It can concern the polyamide of the protective polyamide layer, another polyamide, a polyamide blend or another polymer. The other polymer may concern thermoplastic polyurethanes, duroplastic polyurethanes, polyacrylates, polyester or polycarbonates for example. Polyamide is preferred as the material for the coatings. As a result, the protective layer made of PA MACMI/12 can be coated very well with polyamide materials such as PA MACM12, PA MACM14, PA MACM18, PA MACM36, PA MACM10/11, PA MACM10/1010, PA MACM10/1014, PA MACM14/1114, PA 6I/6T/PACMI/PACMT/MACMI/MACMT/12, PA 12, PA 11, polyester amides, polyether amides, polyether ester amides, PA PACM12/MACM12, PA PACM14/MACM14, PA PACM12, PA PACM14, PA PACM18, PA PACM36 or PA MACMT/12.

The coating materials optionally contain additives which are chosen from the additives already mentioned for the protective polyamide layers. The coating materials can also be provided with optical filtering properties, as required. Further layers can be applied both to the protective polyamide layer and the coating material. It can concern optical thin layers (thickness less than 1 µm), optical thin films (thickness 1 µm to 5 µm), further optical filters or combinations thereof. Thin layers are for example antireflective layers, decorative layers, lens coatings, antireflection coatings or mirror coatings. Thin films include hardcoats or anti-fogging layers for example.

General production requirement for polyamides and the film thereof:

The production of the polyamides occurs in a known manner in known stirrable pressure autoclaves with a feed vessel and a reaction vessel. Deionized water is supplied in the feed vessel and the monomers and additives are added. Inerting is then performed several times with nitrogen. Heating is then performed under stirring to 150 to 230° C. under the occurring pressure in order to obtain a homogenous solution. This solution is then pumped through a screen into the reaction vessel and heated there to the desired reaction temperature of 260 to 310° C. at a pressure of a maximum of 30 bars. The batch is held in the pressure phase for 0.5 to 4 hours at reaction temperature. The pressure is reduced within 1 to 4 hours to atmospheric pressure in the subsequent relief phase, wherein the temperature can decrease slightly. In the subsequent degassing phase, the batch is held at an atmospheric pressure for 0.5 to 3 hours at a temperature of 250 to 340° C. The polymer melt is delivered in the form of a strand, cooled in a water bath at 10 to 80° C. and then granulated. The granulate is dried for 12 to 48 hours at 80 to 120° C. under nitrogen or in vacuum to a water content of under 0.1 percent by weight.

The polyamide has a relative viscosity (measured at 20° C. in a solution of 0.5 percent by weight in m-cresol) of 1.40 to 2.00, preferably 1.45 to 1.90, especially preferably 1.50 to 1.80.

The production of the non-stretched film cast from the solution occurs in a known manner by dissolving the polyamide granulate or powder in a solvent by means of stirring. This occurs at room temperature or increased temperature. In case of increased temperature it needs to be noted that any solvent vapors are condensed and returned. The concentration of the solution is between 10 and 40 percent by weight. The obtained clear solution is applied to a base made of metal, glass or plastic for example. The film formed by the evaporation of the solvent mixture is dried in a furnace, with IR radiators or in the air. It can be detached from the base before or after this drying.

The solvent is chosen from the group consisting of methanol, ethanol, propanol, butanol, isopropanol, tertiary butanol, toluene, xylene, m-cresol, ethyl benzene, tetrahydrofuran, furan, methylene chloride, 2-chlorotoluene, 4-chlorotoluene, dioxane, n-methyl-2-pyrrolidon, dimethyl sulphoxide, formic acid and combinations thereof. The solvent is preferably chosen from the group consisting of methanol/methylene chloride, ethanol/methylene chloride, isopropanol/methylene chloride, ethanol/methylene chloride/tetrahydrofuran, methanol/methylene chloride/tetrahydrofuran, formic acid, ethanol/methylene chloride/toluene, ethanol/methylene chloride/m-cresol, ethanol/methylene chloride/m-cresol, m-cresol, methanol/methylene chloride/m-cresol, formic acid/m-cresol, n-methyl-2-pyrrolidon/methylene chloride/m-cresol, n-methyl-2-pyrrolidon/m-cresol, n-methyl-2-pyrrolidon/formic acid/m-cresol, ethyl benzene/m-cresol, ethyl benzene/formic acid/m-cresol, ethanol/m-cresol, methanol/m-cresol, 2-chlorotoluene/m-cresol, 4-chlorotoluene/m-cresol.

The thickness of the potyamide film cast from the solution is 20 to 195 µm, preferably 25 to 185 µm, especially preferably 40 to 180 µm, more preferably 70 to 180 µm.

Monomers used in the test examples:

| | |
|---|---|
| Isophthalic acid (I): | Melting point 345 to 348° C. |
| | Sublimation temperature 100° C. at 0.07 mmHg |
| | Manufacturer: BP Amoco Chemicals |
| Laurolactam (12): | Melting point 151° C. |
| | Manufacturer: EMS-UBE Ltd. |
| MACM: | Bis-(4-amino-3-methyl-cyclohexyl)-methane |
| | Melting point −7 to −1° C. |
| | Manufacturer: BASF AG |

Production Example

The production of a copolyamide in accordance with the invention will be explained below on the basis of the PA MACMI/12 used in the example No. 2. 42 kg of deionized water are supplied to the feed vessel of a 300 l pressure autoclave and 39.88 kg of isophthalic acid and 50.05 kg of laurinolactam are stirred into the water. Subsequently, 57.76 kg of bis-(3-methyl-4-amino-cyclohexyl)-methane (MACM), 0.015 kg of antifoam RD 10 percent by weight of emulsion (defoamer, manufacturer: Dow Corning) and finally 0.59 kg of benzoic acid are added. The following procedure is taken:

After 10 times of inerting, heating is performed up to 190° C. The homogeneous solution is pumped at 190° C. through a screen into the reaction vessel.

The batch is heated to 280° C. under stirring and held for 1.5 hours at 20 bars in the pressure phase. Within 2.5 hours relief occurs to atmospheric pressure and degassing occurs subsequently for 2 hours at 275° C.

The polymer melt is removed, cooled in a water bath (20° C.) and granulated.

The granulate is dried at 90° C. in vacuum (30 mbar) to a water content of less than 0.1 percent by weight.

The relative viscosity of the product is 1.58.

Example for the production of film:

21 percent by weight of the polyamide of example No. 2 is dissolved in powder form by stirring in a solvent mixture consisting of ethanol/methylene chloride/tetrahydrofuran (weight ratio 23:23:4) heated to 35° C., with the evaporating solvent being returned after condensing. The dissolving process is continued until a completely clear solution has been obtained. A cast film is produced with this solution at room temperature by means of a doctor blade, which cast film is dried after a few minutes of rest at 70° C. The dried film had a thickness of 180 μm.

In order to check the polyamides, the following measuring regulations were used:

| | |
|---|---|
| Haze: | ASTM D 1003 |
| | Round plate, thickness 2 mm, radius 37.5 mm |
| | Temperature 23° C. |
| | Measuring device: Haze Gard plus from Byk Gardner with CIE light type C |
| | The haze value is stated in percent of the irradiated light quantity. |
| Charpy impact strength: | ISO 179/*eU |
| | ISO test rod, standard: ISO/CD 3167, type B1, 80 × 10 × 4 mm Temperature 23° C. |
| | *1 = non-instrumented, 2 = instrumented |
| Charpy notched bar impact strength: | ISO 179/*eA |
| | ISO test rod, standard: ISO/CD 3167, type B1, 80 × 10 × 4 mm Temperature 23° C. |
| | *1 = non-instrumented, 2 = instrumented |
| Glass transition temperature (Tg): | ISO norm 11357-1/-2 |
| | Granulate |
| | The differential scanning calorimetry (DSC) was performed with a heating rate of 20K/min. The temperature at onset is stated as the glass transition temperature. |
| Relative viscosity: | ISO 307 |
| | m-creosol solution with 0.5 percent by weight Temperature 20° C. |
| | Calculation of the relative viscosity (RV) according to RV = t/t$_0$ based on Section 11 of the norm. |

The test specimens were produced on an injection-molding machine from Arburg, model Allrounder 420 C 1000-250. Cylinder temperatures of between 240 and 290° C. were used. The mold temperature was 40 to 80° C. Polished molds were used for sheets for the optical measurements.

The test specimens for the haze measurement are used in the dry state. For this purpose, they are stored after injection molding for at least 48 hours at room temperature in a dry environment, e.g. over silica gel. The test specimens for the measurement of the impact strength and notched-bar impact strength are conditioned according to ISO 1110 for 14 days at 72° C. and 62% relative humidity.

If special requirements are placed on the protective polyamide layer with respect to the nature of the film, especially a high impact strength and a low haze value at the same time, it was noticed that a very specific percentage of the laurolactam needs to be present.

As is shown in Table 1, the protective polyamide layers achieve very good values with a percentage of laurolactam of 25 mole percent, 35 mole percent and 54 mole percent in relation to the entire polyamide.

TABLE 1

| | Unit | Example 1 | Example 2 | Example 3 |
|---|---|---|---|---|
| PA components | | | | |
| MACMI | Mole % | 75 | 65 | 46 |
| Laurolactam | Mole % | 25 | 35 | 54 |
| Measurement results | | | | |
| Haze | % | 0.78 | 0.62 | 0.96 |
| Charpy impact strength, 23° C. | kJ/m$^2$ | >100 | >100 | >100 |
| Charpy notched-bar impact strength, 23° C. | kJ/m$^2$ | 6 | 8 | 9 |
| Glass transition temperature | ° C. | 190 | 160 | 110 |
| Relative viscosity | — | 1.51 | 1.58 | 1.67 |

All examples 1 to 3 in accordance with the invention achieve an impact strength of over 100 kJ/m$^2$, a notched-bar impact strength of over 5 kJ/m$^2$ and also a haze value of less than 1. The glass transition temperature is particularly high with 190° C. in example 1, which is highly advantageous for subsequent back-molding with a polyamide body. The glass transition temperature of the protective polyamide layer is still good with 160° C. in example 2 and still acceptable with 110° C. in example 3.

If the percentage of laurolactam lies beneath 20 mole percent or above 60 mole percent in relation to the entire polyamide, considerably more adverse results are achieved, as is shown in the comparative examples 4 and 5 in Table 2.

TABLE 2

| | Unit | Comparative example 4 | Comparative example 5 |
|---|---|---|---|
| PA components | | | |
| MACMI | Mole percent | 80 | 39 |
| Laurolactam | Mole percent | 19 | 61 |
| Measurement results | | | |
| Haze | % | 0.65 | 2.21 |
| Charpy impact strength, 23° C. | kJ/m$^2$ | 80 | >100 |
| Charpy notched-bar impact strength, 23° C. | kJ/m$^2$ | 4 | 9 |
| Glass transition temperature | ° C. | 200 | 100 |
| Relative viscosity | — | 1.45 | 1.73 |

The comparative example 4 achieves a definitely acceptable haze value of 0.65. The impact strength and also the notched-bar impact strength are too low however, so that this material needs to be classified as brittle. The glass transition temperature on the other hand is very high. The comparative example 5 shows good impact strength and notched-bar impact strength. The haze value however is unacceptably high, so that this material needs to be classified as opaque. Moreover, the glass transition temperature is too low.

The at least one protective polyamide layer meets the requirements with a content of laurolactam of 20 mole percent to 60 mole percent relating to the entire polyamide, which means it has an impact strength of over 100 kJ/m$^2$, a notched-bar impact strength of over 5 kJ/m$^2$ and a haze value of less than 1.

It was further noticed that a non-stretched protective polyamide layer which is cast from the solution and is made of PA MACMI/12 (co-polyamide of example 2 made of MACM and isophthalic acid with a lactam content of 35 mole percent) offers a major advantage concerning the isotropy as compared with the use of extrusion films made from the same material. The same advantage can also be noticed in respect of an extrusion film made from a homopolyamide PA MACM12 (does not contain any aromatic dicarboxylic acid.

In order to verify the advantage of a protective polyamide layer cast from a solution as compared with an extrusion film, a PA/MACMI/12 cast film, a PA MACMI/12 extrusion film and a PA MACM12 extrusion film were measured. For this purpose, two polarization films were arranged behind one another, perpendicular to a Perkin Elmer, Lambda 35 UV/VIS-Spectrometer measuring beam and twisted in relation to one another to such an extent that the light transmission achieved the minimum, the so-called residual light transmission. Between these crossed polarization films, the various cast and extrusion films which were attacked to a frame, were successively held parallel to the polarization films and the light transmission was determined. In the basic position, the frames were fixed in such a way that the extrusion direction of the film extended vertically. Based on this position, the frame with the film was turned by 90° and by 45°, and the respective light transmissions were determined again. The light transmission was measured at three different wavelengths (480 nm, 588 nm and 644 nm). The light transmission and the residual light transmission were stated in percent of the irradiated light.

The cast and extrusion films made of polyamide each had a thickness of 180 µm. The thickness of the used polarization films was 30 µm. They consisted of polyvinyl alcohol.

Table 3 shows the compiled measurement values which are achieved when the measurements are performed at a wavelength of 480 nm. The residual light transmission in crossed polarization films is 0.089%.

TABLE 3

Wavelength 480 nm

|  | PA MACMI/12 Cast film | PA MACMI/12 Extrusion film | PA MACM12 Extrusion film |
|---|---|---|---|
| Basic position | 0.096% | 0.105% | 0.437% |
| Rotation by 90° | 0.091% | 0.117% | 0.172% |
| Rotation by 45° | 0.099% | 0.205% | 0.236% |

It can be noticed that the cast film in accordance with the invention which is made of PA MACMI/12 increases the light transmission at 480 nm in the basic position merely from 0.089% to 0.096%. The difference in light transmission is merely 0.007% here. When the cast film is turned by 90°, the light transmission sinks to 0.091%. It rises slightly to 0.099% when turned by 45°. Since the light transmission changes by a maximum of only 0.008% at 480 nm depending on the position of the cast film, good isotropy can be attested to the cast film made of PA MACMI/12. A protective polyamide layer is generally regarded as isotropic in connection with the present invention when the light transmissions of the three positions differ by a maximum of 0.013%, preferably by a maximum of 0.010%.

With the extrusion film made of PA MACMI/12, the light transmission increases at 480 nm in the basic position from 0.089% to 0.105%, which is by 0.016%. The values of the extrusion film made of PA MACMI/12 vary in total even by up to 0.100%. The anisotropy is even more pronounced with the extrusion film made of the homopolymer PA MACM12, in which the light transmission increases at 480 nm in the basic position from 0.089% to 0.437%, which is by 0.348%. The values with the extrusion film made of PA MACM12 vary in total even up to 0.265%. This anisotropy of the extrusion films contributes to blurred images.

Table 4 shows a compilation of the measured values which are achieved when the measurements are performed at a wavelength of 588 nm. The residual light transmission with crossed polarization foils is 0.053%.

TABLE 4

Wavelength 588 nm

|  | PA MACMI/12 Cast film | PA MACMI/12 Extrusion film | PA MACM12 Extrusion film |
|---|---|---|---|
| Basic position | 0.187 | 0.197 | 0.285 |
| Rotation by 90° | 0.179 | 0.189 | 0.211 |
| Rotation by 45° | 0.177 | 0.207 | 0.366 |

It can be noticed that the cast film in accordance with the invention which is made of PA MACMI/12 increases the light transmission at 588 nm in the basic position from 0.053% to 0.187%. The difference is 0.134% here. The light transmission decreases to 0.179% when the cast film is rotated by 90°. It decreases to 0.177% when rotated by 45°. Since the light transmission at 588 nm differs by a maximum of only 0.010% depending on the position of the cast film, the cast film made of PA MACMI/12 can be attributed with good isotropy at this wavelength too.

With the extrusion film made of PA MACMI/12, the light transmission increases at 588 nm in the basic position from 0.053% to 0.197%, which is by 0.144%. The values with the extrusion film made of PA MACMI/12 vary in total by 0.019%. Anisotropy is even more pronounced with the extrusion film made of the homopolymer PA MACM12, with which the light transmission increases at 588 nm in the basic position of the polarization films from 0.053% to 0.285%, which is by 0.232%. The values with the extrusion film made of PA MACM12 vary in total by 0.155%, so that the two comparative films made by extrusion have only very bad isotropy.

Table 5 shows a compilation of the measured values which are achieved when the measurements are performed at a wavelength of 644 nm. The residual light transmission is 0.050% at crossed polarization films.

TABLE 5

Wavelength 644 nm

|  | PA MACMI/12 Cast film | PA MACMI/12 Extrusion film | PA MACM12 Extrusion film |
|---|---|---|---|
| Basic position | 0.060 | 0.068 | 0.254 |
| Rotation by 90° | 0.069 | 0.083 | 0.102 |
| Rotation by 45° | 0.064 | 0.073 | 0.274 |

It can be noticed that the cast film in accordance with the invention which is made of PA MACMI/12 increases the light transmission at 644 nm in the basic position from 0.050% to 0.060%. The difference is only 0.010% here. The light transmission increases to 0.069% when the cast film is rotated by 90°. It increases to 0.064% when rotated by 45°. Since the light transmission at 644 nm changes by a maximum of only 0.009% depending on the position of the cast film, the cast film made of PA MACMI/12 can be attributed with good isotropy at this wavelength too.

With the extrusion film made of PA MACMI/12, the light transmission increases at 644 nm in the basic position from 0.050% to 0.068%, which is by 0.018%. The values with the extrusion film made of PA MACMI/12 vary in total by 0.015%. Anisotropy is even more pronounced with the extrusion film made of the homopolymer PA MACM12, with which the light transmission increases at 644 nm in the basic position of the polarization films from 0.050% to 0.254%, which is by 0.204%. The values with the extrusion film made of PA MACM12 vary in total by 0.172%.

Control experiments have shown that no cast films can be produced from PA MACM 12, which is also known as "GRILAMID TR 90" (EMS-CHEMIE AG) because no clear solution can be achieved on the one hand and the solution is unstable on the other hand, which means that the solution will thicken within a short period of time and lumps will form.

The advantages of the optical filter in accordance with the invention comprise the following:

- The proposed non-stretched protective polyamide layers which are cast from the solution and made of PA MACMI/12 can be produced with constant thickness in a few working steps.
- A simple variation of the glass transition temperature is enabled by changing the content of laurolactam.
- The proposed protective polyamide layers show favorable optical isotropy which is substantially better than that of extrusion films.
- The proposed protective polyamide layers made of PA MACMI/12 are of high optical quality (concerning content of gel particles, inclusions, dust particles, etc.) and show low haze values.
- There is very good bonding even without any bonding agent layer between the film made of polyvinyl alcohol, polyvinyl acetals, polyvinyl butyrals or mixtures thereof and the protective polyamide layer.
- There is very good bonding even without any bonding agent layer between the protective polyamide layer and the additionally applied polyamide.
- The protective polyamide layer shows very good chemical resistance.
- The protective polyamide layer shows very good stress crack resistance.
- The protective polyamide layer has a very good Abbé number (40 to 55).
- The protective polyamide layer has a very good refractive index $n_D^{20}$ (1.50-1.60).

The invention claimed is:

1. An optical filter which comprises at least one optically effective layer and a protective layer on both sides, with at least one of the protective layers being a non-stretched protective polyamide layer which is cast from solution, wherein the at least one protective polyamide layer consists of PA MACMI/12 and optional additives, with the at least one protective polyamide layer having a content of laurolactam of 23 mole percent to 57 mole percent in relation to the entire polyamide; wherein the optically effective layer consists of polyvinyl alcohol, polyvinyl acetal, polyvinyl butyral, or mixtures thereof, and wherein the optical filter does not comprise any bonding agent layer between the at least one protective polyamide layer and the optically effective layer.

2. An optical filter according to claim 1, wherein the at least one protective polyamide layer has a content of laurolactam of 31 mole percent to 55 mole percent, relating to the entire polyamide.

3. An optical filter according to claim 1, wherein the at least one protective polyamide layer is arranged as a cast polyamide film with a thickness of 20 to 195 μm.

4. An optical filter according to claim 1, wherein the optical filter comprises one or two protective polyamide layers.

5. An optical filter according to claim 1, wherein the optically effective layer consists of polyvinyl alcohol.

6. An optical filter according to claim 1, wherein the at least one protective polyamide layer has a content of laurolactam of 38 mole percent to 55 mole percent, relating to the entire polyamide.

7. An optical filter according to claim 1, wherein it is provided on one or both sides with a coating.

8. An optical filter according to claim 7, wherein the material for the coating is a polyamide, polyamide blend, or a polymer.

9. An optical filter according to claim 8, wherein optical thin layers, optical thin films, further optical filters, or combinations thereof are applied to the coating and/or to the protective polyamide layer.

10. An optical filter according to claim 9, wherein the optical thin layers or optical thin films are chosen from the group which comprises antireflective layers, decorative layers, lens coatings, antireflection coatings, mirror coatings, hardcoats, and anti-fogging layers.

11. An optical filter according to claim 1, wherein the optional additives are chosen as required from a group which comprises inorganic and organic stabilizers, heat stabilizers, light stabilizers, UV stabilizers, UV absorbers, UV blockers, IR absorbers, NIR absorbers, antioxidants, antiozonants, nucleating agents, crystallization retardants, demolding agents, lubricants, antiblocking agents, separating agents, organic and inorganic pigments, coloring agents, condensation catalysts, chain regulators, defoaming agents, chain-extending additives, softeners, photochromic additives, non-modified and modified, natural and synthetic phyllosilicates and optical brighteners.

12. An optical component with an optical filter according to claim 1, wherein this component is an illumination filter, a filter for laser scanners, a sensor, a safety curtain, a spectacle lens, a helmet visor, protective goggles, sports goggles, a lens or filter for a projection device, a lens or filter for a measuring instrument, or a photographic filter.

13. An optical filter according to claim 3, wherein the at least one protective polyamide layer is arranged as a cast polyamide film with a thickness of 25 to 185 μm.

14. An optical filter according to claim 3, wherein the at least one protective polyamide layer is arranged as a cast polyamide film with a thickness of 40 to 180 μm.

* * * * *